(No Model.) 2 Sheets—Sheet 1.

F. G. HOBART.
STEAM ENGINE.

No. 513,929. Patented Jan. 30, 1894.

Witnesses:
CC Bindine
Horace A. Dodge.

Frank G. Hobart,
Inventor,
per Dodge Sons,
Att'ys (No Model.) 2 Sheets—Sheet 2.

F. G. HOBART.
STEAM ENGINE.

No. 513,929. Patented Jan. 30, 1894.

Witnesses
CC Bindine
Horace A. Dodge.

Frank G. Hobart
Inventor,
per Dodge Sons,
Attys.

UNITED STATES PATENT OFFICE.

FRANK G. HOBART, OF BELOIT, WISCONSIN.

STEAM-ENGINE.

SPECIFICATION forming part of Letters Patent No. 513,929, dated January 30, 1894.

Application filed June 14, 1893. Serial No. 477,513. (No model.)

*To all whom it may concern:*

Be it known that I, FRANK G. HOBART, a citizen of the United States, residing at Beloit, in the county of Rock and State of Wisconsin, have invented certain new and useful Improvements in Steam-Engines, of which the following is a specification.

My invention relates to that class of steam engines having four valves, two at each end of the cylinder, and is intended to provide first, a simplified construction that shall reduce the cost of building without sacrificing any of the requisites of the valve action to secure economy and smooth running; second, a valve chamber at each end of the cylinder, containing both a steam and an exhaust valve, and secured to the cylinder by bolts or other suitable means, thus making it easily removable for inspection of the valves; third, a removable valve chamber whose joints with the external surfaces of the cylinder may be steam tight by means of any packing ordinarily used for flat steam joints; fourth, a simple and compact disengaging valve gear mechanism; fifth, a mechanism so inclosed that the chamber or box within which it operates may be filled wholly or partially with oil, insuring perfect lubrication and reducing the noise usually accompanying the action of disengaging gears; sixth, steam cushions within the valve chamber itself, or having communication only with the steam space or valve chamber to perform the functions of the usual external air cushions, simplifying construction and reducing noise.

Figure 1:
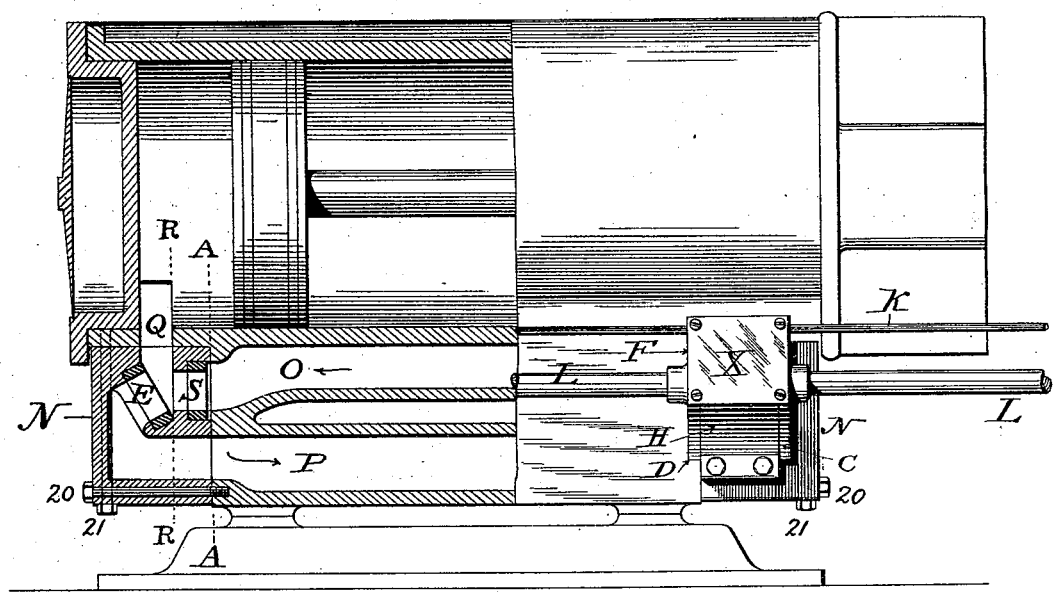
Figure 2:
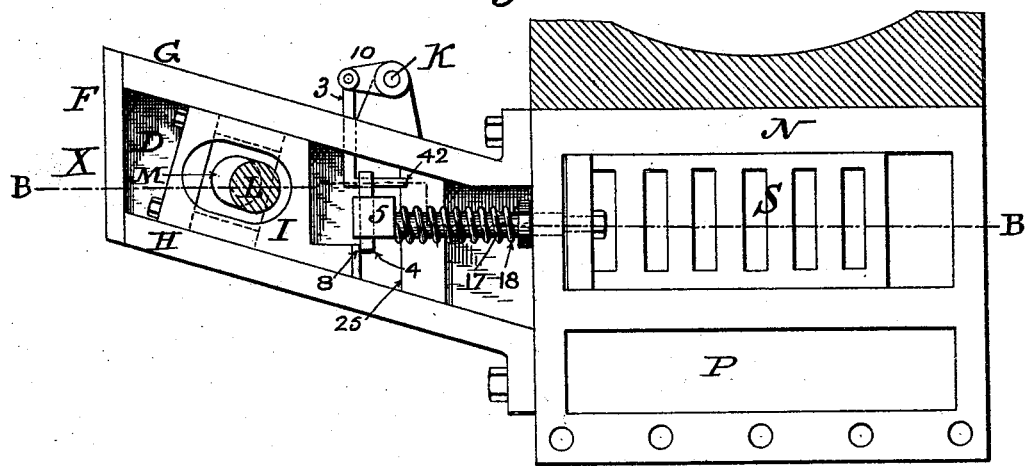
Figure 3:
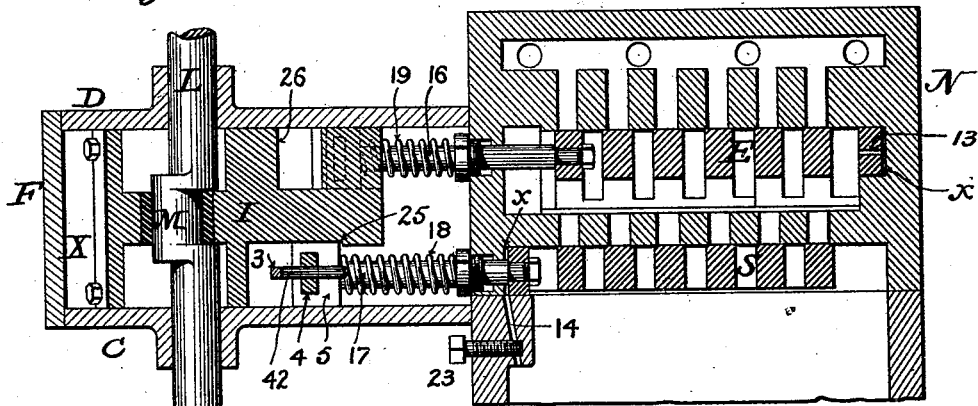
Figures 4, 5, 6:
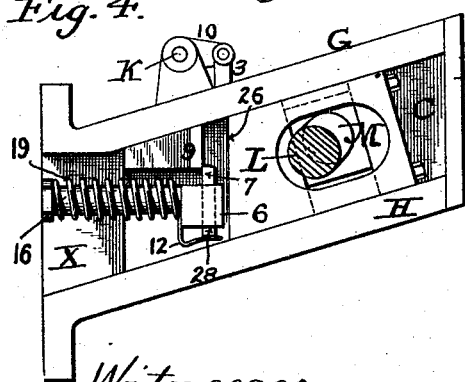

In the accompanying drawings,—Figure 1 is a side elevation, partly in section, of a portion of an engine provided with my improvement; Fig. 2, a vertical sectional view on the line A—A looking to the left, and with one of the side plates of the gear case removed; Fig. 3, a horizontal sectional view on the line B—B of Fig. 2. Fig. 4 is a side view of the gear case from the opposite side from that in Fig. 2; and Figs. 5 and 6, views illustrating certain details of construction.

The valve chamber N contains seats for both steam and exhaust valves S and E, which, as shown in Fig. 1, are designed to move transversely to the axis of cylinder. They could, however, be adapted to move at right angles to the direction indicated.

At each end of the cylinder there is a recess, in one surface of which is the port or opening Q communicating directly with the cylinder and serving for both induction and eduction of steam; while in another surface are openings from the steam space or passage O and the exhaust passage P. This particular arrangement of the exhaust passage P is not essential, since exhaust pipes may be connected directly to the valve chamber N. Into the recess thus formed the valve chamber N is fitted. It has surfaces with openings to correspond with the openings made in the cylinder, and it is held in place by bolts 20 and 21, or any other suitable means. Both surfaces of contact (between the cylinder and the valve chamber) are made steam tight in any manner suitable for flat steam joints.

I am aware that a similar arrangement of valves has been used with a removable tapered plug, but my invention differs from this in that the cylinder casting with all of the work attending its construction becomes much simplified; all interior passages are straight; all open into the recesses at the end of the cylinder; and all of the finished surfaces are planed except the bore of the cylinder. Moreover, with the tapered plug referred to, holes in the cylinder casting must be bored, and the plugs finished to fit so nicely as to prevent steam from passing the joints; whereas my valve chamber is held to the cylinder against external surfaces that can be packed in the usual manner.

I have shown the chamber N as made of a single casting, but if desired it may be made in two parts, which would separate on the line R—R, Fig. 1.

The valves S and E are of the grid iron type, having numerous openings corresponding to similar openings in the valve seats of the valve chamber N, and the said valves are actuated by mechanism which is mounted wholly within the case or box X secured to the front side of the valve chamber N, as clearly shown in Figs. 1, 2, 3 and 4. This box or case X will have its joints made tight so that it may be filled wholly or partially with oil.

L indicates a shaft which passes through the boxes or casings X and is geared with the crank shaft so as to revolve in unison therewith. Within each gear case or box X a crank M is formed on the shaft L, for a purpose presently explained. Above and parallel with the shaft L is a rockshaft K which is connected with the governor or other regulator to effect the cut off sooner or later, as may be required.

The steam valve S is provided with a rod or stem 17 having a head or enlargement 5; the said stem being encircled by a coiled spring 18, or other suitable means for closing the valve. The head 5 is slotted vertically,— Figs. 2 and 4,—to receive a latch 4 which latch comprises merely a flat plate having a hole or opening at or near its upper end, and so fitted to the head 5 as to slide freely through the latter to allow its lower end to project beyond the lower face of the head.

Projecting through the hole or opening in the latch 4 is the horizontal arm 42 of the latch-lifting lever 3 which is designed to be actuated through or by means of the rockshaft K controlled by the governor or regulator of the engine. No matter what may be the position of the latch with reference to the valve stem, the said latch will remain in engagement with and slide freely back and forth upon the arm 42 of the latch-lifter 3.

I indicates a block mounted within the box or casing X, the upper and lower walls of which are inclined relatively to the valve and its stem, the said block being reciprocated within the box by means of a crank or eccentric M formed upon or secured to the shaft L. This block I is provided at one side with a steel bearing face or shoulder 8 which when the block is at its outermost position, engages or bears against the projecting end of latch 4, as clearly shown in Fig. 2. When the shaft L (which is geared to or actuated by the crank shaft of the engine) rotates, its crank or eccentric M carries the block I inwardly and as it moves inward it also moves downward away from the valve stem, on account of the inclination of the walls of the box X. As before stated, the lug or projection 8 is in position to engage the latch 4 just prior to the commencement of the inward movement of the block, and it will be seen upon reference to Fig. 2 that when the block moves inward it will, by reason of its engagement with the latch, carry the valve inward. But owing to the fact that the valve stem moves in a horizontal line, and the block moves downward away from the latch, it is apparent that at a certain point in the travel of the block, its lug or projection 8 will move out of engagement with and pass below the latch 4. As soon as the lug and latch are thus disengaged, the coiled spring 18, which has been put under tension by the inward movement of the valve stem, immediately closes or throws the valve S outward to effect the cut-off. It will be seen that as the latch 4 is made to project more or less below the lower face of head 5 by means of the governor connections the point of valve release and cut-off will be earlier or later according to the extent or in proportion to the projection of the latch through the head 5. As the block moves backward and upward it rises and passes beneath the latch 4, which latter thereupon falls in front of the lug or projection 8, preparatory to being carried inward again. If for any reason the spring 18 should fail to close the valve, the latter will be closed positively by reason of the lug or shoulder 25 on the side face of the block I engaging the head 5 of valve stem 17, as shown in Fig. 4.

The exhaust valve E is operated in substantially the same manner and preferably but not necessarily by the same block I. Upon reference to Fig. 3 it will be seen that the valve stem 16 has a head or enlargement 6 through which works a latch 7. This latch 7 does not have any hole or opening to receive a latch-lifter, nor does it require any lifter, as the points at which the exhaust valve opens and closes remain fixed. This latch has, however, a head 28 which is held normally against the under face of the head 6 by means of a flat spring 12, as shown in Fig. 3, the length of the latch being such that it shall project also above the upper face of the head 6. The stem 16 is encircled by a coiled spring 19 which however is designed to act, not by expansion, but by contraction; or in other words, when the valve is opened the spring is extended, but when the valve is released, the spring, by contracting, closes the valve.

The latch 7 is operated upon or engaged by a lug or projection 9 upon the block I, and the parts are so arranged that when the block is at the limit of its inward movement, it will be in engagement with the upper end of the latch. As the block moves outward it, by reason of the engagement of the lug 9 and latch 7, draws the valve outward, but as the block I moves upward away from the valve stem at the same time that it moves outward, it will, before the completion of its outward movement, disengage itself from the latch 7, and allow the spring 19 to close the valve. If for any reason, the spring 19 should fail to act, a face 26 of the block will strike against the end or head 6 of the valve stem and close the valve positively.

To prevent the striking of the valves in closing, I have shown in Fig. 4 air or steam pockets $x$ formed in the valve chamber to receive the ends of the valves; and suitable ducts 13 and 14 leading from said pockets. By varying the area of these ducts,—as for instance by set screw 23,—the cushioning action may be varied or controlled.

The box X to which I have referred, and in which the valve-actuating mechanism is mounted, is composed of the top and bottom plates G H, the sides C D and the end wall or plate F, suitably bolted or otherwise securely fastened to render the box oil-tight; and the whole securely fastened to the end of the valve chamber. This box is filled, wholly or partially, with oil, thereby insuring perfect lubrication and reducing the noise usually accompanying the action of disengaging valve gears.

I do not wish to limit or restrict myself to the particular coiled spring shown, since the valves may be closed by the ordinary vacuum or dash pots, or by the steam pressure itself acting on the area of the valve stem where it passes out of the valve chest.

While the latch 7 is not ordinarily required to be adjusted with reference to the valve stem or the head carried by the latter, still it may in some cases be desirable to render it so, and to secure this result I would substitute in place of the shoulders 28, a set screw to limit the upward movement of the latch. It is obvious that by turning the screw into or out of the latch, the upward movement of the latter will be limited correspondingly and allowed to project above the upper face of the valve stem or its head, to a greater or less extent.

Having thus described my invention, what I claim is—

1. An engine cylinder having a substantially rectangular recess at each end, in one surface of which is a single port or opening leading into the cylinder, and in the other an opening leading from the steam space or passage; in combination with a valve chamber applied to such recesses and having openings corresponding with those formed in the cylinder, valves mounted in such chamber, and means for operating the valves.

2. A cylinder having a substantially rectangular recess at each end, in one surface of which is a single port or opening leading into the cylinder proper, and in the other two openings communicating one with the steam space and the other with the exhaust passage; in combination with a valve chamber fitted to such recesses and provided with corresponding openings, valves mounted in such chamber, and means for operating the valves.

3. In combination with a steam valve and an exhaust valve; a single block and intermediate connections for opening and then releasing said valves; and means for closing said valves.

4. In combination with a steam valve and an exhaust valve, a single block for actuating both of said valves and having its line of motion inclined to that of the valves.

5. In combination with the engine frame, the oil-tight box secured thereto, and suitable mechanism for actuating the engine valves, mounted wholly within the box.

6. In combination with the inclined box X and the steam valve S; the sliding block I provided with lug 8; the valve stem 17; and the latch 4 carried by the stem and adapted to be engaged by the lug 8.

7. In combination with inclined box X and steam valve S; the sliding block I having lug 8; the valve stem 17; latch 4 carried by the stem; the latch lifter 3 engaging the latch; and governor connections for actuating the latch lifter.

8. In combination with the inclined box X and steam valve S; the sliding block I having lug 8; the valve stem 17 provided with latch 4; and the latch lifter 3 provided with a horizontal arm 42 to engage the lifter.

9. In combination with inclined box X and exhaust valve E; the sliding block I having lug 8; and the valve stem 16 provided with latch 7 and spring 12.

10. In combination with a sliding valve; a block having its line of motion inclined to that of the valve, and a vertically moving latch adapted to form a connection between the valve and block.

11. In combination with a valve having a latch; a block I provided with a lug to engage the latch; a spring adapted to close the valve; and a shoulder formed upon the block to close the valve should the spring fail to act.

12. In combination with a valve and a reciprocating block, a latch carried by one of said parts to be engaged by the other whereby the valve is actuated, and means under the control of the governor for adjusting the latch, whereby the point of cut-off may be changed.

13. In combination with a valve and a block adapted to reciprocate one at an angle to the other; a latch forming a connection between said valve and block.

14. In combination with a valve and a block adapted to reciprocate one at an angle to the other; a latch forming a connection between said valve and block; and means for adjusting the position of the latch whereby the disengagement of the parts may be effected sooner or later in the stroke.

15. In combination with a valve movable in a right line, a block having its rectilinear line of motion inclined to that of the valve,—said block and valve being so arranged that the inclined movement of the block shall disengage the valve from the block,—and means to close the valve when disengaged from the block.

In witness whereof I hereunto set my hand in the presence of two witnesses.

FRANK G. HOBART.

Witnesses:
   E. V. TODD,
   C. D. HARRIS.